United States Patent [19]
Walsh et al.

[11] 3,887,396
[45] June 3, 1975

[54] MODULAR ELECTROCHEMICAL CELL

[75] Inventors: William J. Walsh, Naperville; Albert A. Chilenskas, Western Springs, both of Ill.; Elton J. Cairns, Troy, Mich.; Paul A. Nelson, Wheaton, Ill.

[73] Assignee: The United States Energy Research and Development Administration, Washington, D.C.

[22] Filed: Nov. 15, 1973

[21] Appl. No.: 416,311

[52] U.S. Cl. ................ 136/6 L; 136/20; 136/100 R
[51] Int. Cl. .......................................... H01m 43/00
[58] Field of Search ........ 136/6 F, 6 LF, 6 LN, 6 L, 136/83 R, 83 T, 100 R, 155, 20, 108, 135, 111

[56] References Cited
UNITED STATES PATENTS

| | | | |
|---|---|---|---|
| 3,428,493 | 2/1969 | Adams | 136/100 R |
| 3,445,288 | 5/1969 | Buzzelli | 136/6 LF |
| 3,462,313 | 8/1969 | Rightmire et al. | 136/100 R |
| 3,488,221 | 1/1970 | Shimotake et al. | 136/20 |
| 3,501,349 | 3/1970 | Benak | 136/20 |
| 3,531,324 | 9/1970 | Fischer et al. | 136/20 |
| 3,666,560 | 5/1972 | Cairns et al. | 136/20 X |
| 3,716,409 | 2/1973 | Cairns et al. | 136/20 X |

*Primary Examiner*—Anthony Skapars
*Attorney, Agent, or Firm*—John A. Horan; Arthur A. Churm; Hugh W. Glenn

[57] ABSTRACT

A high-temperature alkali-metal/chalcogen electrochemical cell includes a porous cathode interposed between two porous anodes within a disk-shaped housing. The electrodes are electrically separated by a cloth of insulative material and current flow is provided through a molten electrolyte which permeates the cloth. Electrical terminals from the cathode and the anode extend axially from opposite surfaces of the housing and are of mating prong and socket construction to permit stacking of a plurality of cells in electrical series.

8 Claims, 2 Drawing Figures

MODULAR ELECTROCHEMICAL CELL

CONTRACTUAL ORIGIN OF THE INVENTION

The invention described herein was made in the course of, or under, a contract with the United States Atomic Energy Commission.

BACKGROUND OF THE INVENTION

This invention relates to secondary electrochemical cells that can be assembled into a battery of such cells for the production of power. Such a battery is intended for use as a power source for an electric automobile or for the storage of energy that can be generated during intervals of off-peak power consumption within an electrical distribution network. A single cell of this type or a battery comprising only a few cells can have application as an implantable power source for an artificial heart or heart-assist device.

A substantial amount of work has been done in the development of electrochemical cells and their electrodes. The cells showing most promise employ alkali metal anodes such as lithium or sodium, molten salt electrolytes containing the alkali metal ions and cathode materials of Groups VIA and VIIA of the Periodic Chart, the chalcogens and halogens. Examples of such secondary cells and their various components are disclosed in U.S. Pat. Nos. 3,716,409 to Cairns et al. entitled "Cathodes for Secondary Electrochemical Power-Producing Cells", Feb. 13, 1973; 3,666,560 to Cairns et al. entitled "Electrochemical Power-Producing Cell", May 30, 1972; and 3,488,221 to Hiroshi Shimotake et al., Jan. 6, 1970. All of these patents are assigned to the assignee of the present application.

Although this previously developed, electrochemical-cell technology has shown promise in providing batteries with sufficient specific energy and specific power to meet modern-day problems, a number of difficulties still exist in the design of a practical electrochemical cell. The high operating temperatures, e.g. 375°C. to over 400°C., as well as the high level of thermodynamic activity of the cathode and anode reactants cause severe corrosion problems within the cell. Numerous cell failures have occurred as a result of breakdown in electrically insulative feedthroughs for electrical terminals. Cell life is also shortened as a result of loss of chalcogen from the cathode by vaporization and transfer into the electrolyte and to the anode. Other problems result from the relatively poor electrical conductivity of the chalcogens, sulfur and selenium, thus necessitating the use of current collector structures and electrically conductive additives within the cathode. Such additives and collectors not only add to the nonreactive weight of the cell but impede mass transfer within the electrode, increase diffusion overvoltages and interfere with the complete utilization of the cathode reactant.

In view of these problems existing in prior art technology, it is an object of the present invention to provide an improved modular electrochemical cell for inclusion within a battery of such cells for the production of electrical power.

It is a further object to provide an electrochemical cell in which the corrosion of the housing and electrical feedthroughs are held at a minimum.

It is also an object to provide an electrochemical cell having an improved system of cathode current collector and electrical terminals.

It is a further object to provide an improved method for preparing anodes within an electrochemical cell.

SUMMARY OF THE INVENTION

In accordance with the present invention, a secondary electrochemical cell is provided which includes an alkali metal anode, a cathode containing a chalcogen and an electrolyte including ions of said alkali metal. The cell is enclosed within a hollow housing having a small height relative to width. Included within the housing are two porous, anode structures disposed adjacent to the upper and lower, inner end surfaces of the housing. The anodes are of sufficient breadth or diameter to be in electrical contact with the housing at their circumferential margins. A porous solid cathode structure of paste consistency is located between the two anode structures, with its circumferential margins spaced inwardly from the inner surfaces of the housing. The anodes and cathode are separated by an electrically insulative cloth layered around the cathode. The cloth is permeated by an electrolyte containing ions of the alkali metal to allow ionic current flow between the electrodes.

A plurality of these electrochemical cells can be interconnected through mating electrical terminals axially aligned on opposite surfaces of the housing. One of these terminals will be in contact with the housing and the two anodes, while the other terminal is insulated from the housing and penetrates into electrical communication with the cathode.

DETAILED DESCRIPTION OF THE DRAWINGS

The present invention is illustrated in the accompanying drawings wherein.

DETAILED DESCRIPTION OF THE PREFERRED EMBODIMENT

Figure 1:
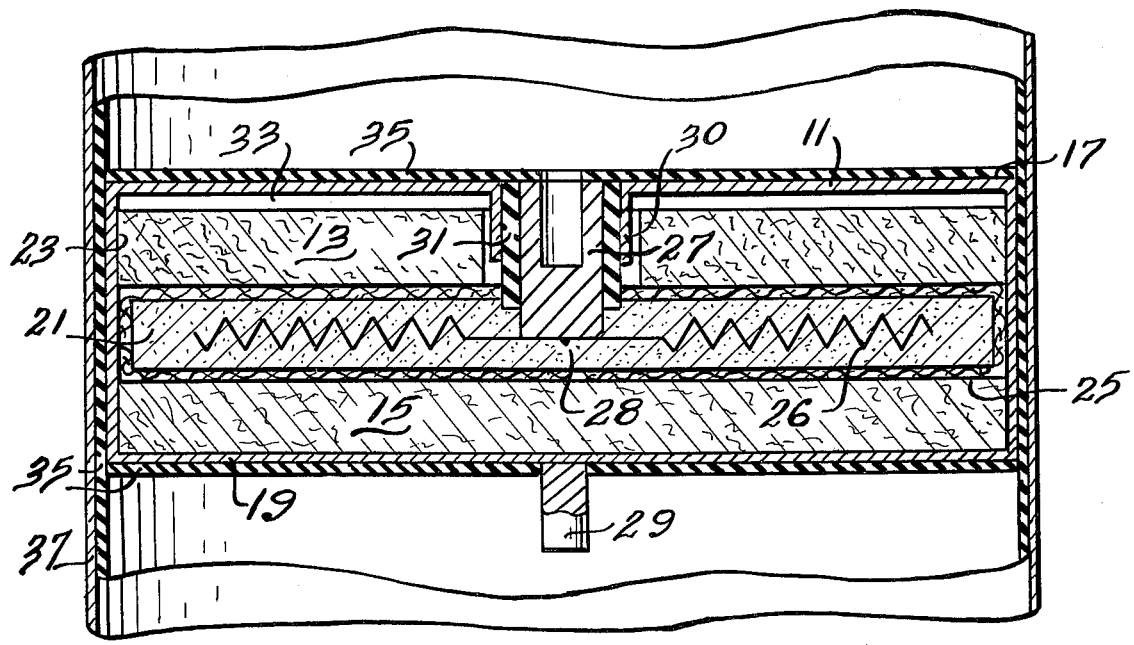
FIG. 1 is an elevation view in cross section of a modular electrochemical cell.

In FIG. 1 a modular, secondary electrochemical cell is shown with an outer housing 11 of electrically conductive and corrosion-resistant material such as stainless steel. A preferred form of housing 11 is a hollow disk with a small height with respect to diameter or breadth. It will be clear that housings of other shapes such as a prism having a small height to width and length can also be used. For instance, a prism having square end surfaces and a relatively short height could be neatly stacked and assembled within a battery of cells.

First and second anode structures 13 and 15 are aligned parallel to the end surfaces within housing 11. A cathode structure 21 lies between the two anode structures within the cell to form a parallel and intermediate lamina that is separated from the inner walls of the housing. Each of the anode structures 13 and 15 electrically communicates with the steel housing 11 at its inner circumferential surfaces 23. The cathode structure 21, on the other hand, is of smaller diameter or breadth than the anode structures and is axially aligned within the cell housing to be spaced from inner circumferential surfaces 23. Cathode structure 21 is further separated from the housing and the anode structures by an electrically insulative cloth 25 which completely encloses it except for an opening at the upper center for the connection of an electrical terminal 27. Cloth 25 is of a porous material to allow migration of ions within a molten salt electrolyte, e.g. a eutectic composition of LiF-LiCl-KCl, that is included between the cathode and anode structures. As shown, the electrode structures do not completely fill the cell height but a space 33 is left at the upper end of housing 11 to accommodate expansion as the cell is brought to operating temperature.

The anode and cathode structures are of porous construction and are relatively thin in respect to their diameters. These factors in combination with the double anode construction, one at each cathode end surface, place the electrode reactants close to the electrolyte interface where the cell reactions are expected to occur. Consequently, the proportion of reactants utilized in a single discharge cycle will be high to minimize cell weight. Also, the current density at a given discharge rate will be lower than for thicker electrodes.

Electrical connections to the modular electrochemical cell are made through electrical terminals 27 and 29 which are axially aligned on opposite end surfaces of housing 11. The terminals are of electrically conductive and corrosion resistant materials such as molybdenum or tungsten. The negative terminal 29 is shown affixed to the bottom end surface 19 of housing 11 and it is thereby in electrical contact with anodes 13 and 15.

Positive terminal 27 is concentrically encompassed by a ceramic insulator 31 such as of calcium zirconate that extends lengthwise from upper end surface 17 into cathode structure 21. Insulator 31 is brazed to a tubular lip 30 that extends inwardly from the upper surface of housing 11 into a central opening within anode 13. The opening is of slightly larger diameter than that of lip 30 to leave a small gap for release of cathode gases into space 33. Terminal 27 extends beyond the insulator into electrical communication with a reticular, current-collector grid 26 embedded within cathode structure 21. Grid 26 comprises a plurality of sinuous wires of an electrically conductive, inert material such as niobium or molybdenum disposed radially within the cathode to form a star-like network having a juncture point 28 in fixed electrical contact with terminal 27. This arrangement minimizes the length and therefore the necessary diameter and mass of a current collector within a given cell.

The two terminals 27 and 29 are of mating construction with terminal 27 having an axial socket opening adapted to closely receive the circular pin or prong construction of the negative terminal on an adjacent cell. Through employment of mating electrical terminals on opposite end surfaces, a plurality of the electrochemical cells can be stacked in an electrical series arrangement. The mating surfaces of the two terminals are thus enclosed between adjacent cells to minimize oxidation from air exposure. It will be clear that other types of mating electrical terminals known in the art can also be used and that the prong or pin and socket configurations of the positive and negative electrodes can be reversed. However, in the present embodiment, a pin-type terminal at 29 is preferred to avoid a breach or penetration through housing end surface 19.

In order to form a series-connected battery or battery portion with a plurality of the electrochemical cells, sheets of electrically insulative material 35 are interposed between the cells on end surfaces 17 and 19 and are wrapped around the circumferential surfaces of the cell stack. Material 35 can be formed of a glass or ceramic fabric impregnated with a polyimide plastic material or other electrically insulative material capable of sustaining high temperatures. The cell stack is further protected and hermetically sealed within a battery casing 37 of a material such as stainless steel. Where a single cell stack is insufficient, a plurality of such battery portions can be interconnected in electrical parallel or series to increase current capacity or voltage depending on the application.

Anode structures 13 and 15 contain an alkali metal such as lithium or sodium as an anode reactant. One form of anode that can be employed in the modular electrochemical cell includes a porous substrate of stainless steel impregnated with molten lithium metal. The stainless steel substrate will ordinarily comprise a compacted and sintered mass of stainless steel fibers processed to provide the desired porosity, e.g. about 90%. Since the molten lithium metal is a highly reactive material, it provides a relatively high cell voltage when used in combination with a particular chalcogen cathode. For example, the open circuit potential is about 2.4 volts with this type anode in combination with a cathode containing elemental sulfur.

As a result of the high activity of the anode reactant, a corrosion problem is also presented in respect to the electrical feedthroughs and the electrode separator materials. In some instances, it is preferable to sacrifice anode reactant activity for a lower corrosion rate within the cell. One manner of doing this is to utilize a lithium-aluminum alloy as the anode material. Such as alloy may, for example, contain about 40-46 a/o lithium and about 54-60 a/o aluminum. However, such a Li-Al/S cell has a slightly reduced voltage (about 0.3 volt less) as compared to the Li/S cell.

An aluminum-lithium electrode can be produced by either electrochemcially preforming an aluminum-lithium alloy and then assembling the cell or by charging an aluminum electrode within the cell in the presence of an electrolyte and sufficient lithium ions. The production of an anode of this type has heretofore required that the aluminum-lithium material be preconditioned within the cell after formation by a slow charge and discharge during early usage. Otherwise, the electrode can be damaged by the expansion and contraction that occurs as lithium ions enter and leave the electrode structure. Also, if the initial charge and discharge cycles are carried out too rapidly, local regions of liquid metal alloy are built up with resulting pitting of the aluminum-lithium electrode. On discharging the cell, the weakened aluminum substrate will disintegrate preventing recharge.

The inventors have found, however, that this initial slow preconditioning of the aluminum-lithium anode can be minimized and the integrity of the aluminum substrate preserved by beginning with a porous aluminum matrix and electrodepositing lithium metal into the interstices of this matrix to form lithium-aluminum alloy. A suitable aluminum matrix will comprise an integral mass having a porosity of about 40 – 60%. It can be a randomly interlocked structure of metal fibers which are sintered together or a compaction of metal particles or wires. Alternatively an aluminum foam of the desired porosity can be employed.

Figure 2:
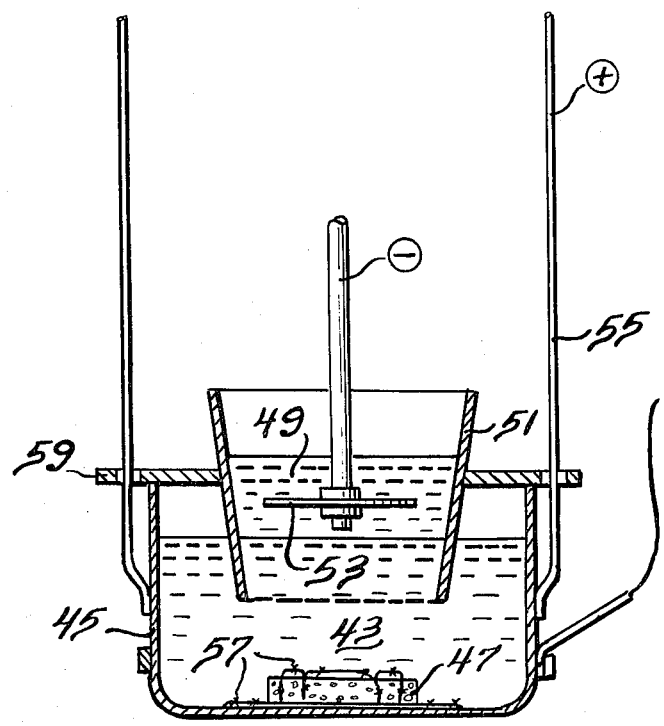
FIG. 2 is an elevation-view schematic of a cell employed to form components of the FIG. 1 cell.

FIG. 2 illustrates an apparatus for preparing a lithium-aluminum alloy within a porous substrate for use as an anode. An electrolyte 43 containing lithium ions such as an eutectic composition of LiF-LiCl-KCl covers a porous aluminum substrate 47 within an open stainless steel vessel 45. In forming the lower anode (15 in FIG. 1) the cell housing can be substituted for this vessel. Liquid lithium metal 49 floats on the surface of the electrolyte 43 and is contained within an open-ended cup 51 supported by a holder 59. A disk-shaped electrical terminal 53 of negative polarity is submerged within the lithium metal while the corresponding electrical terminal of positive polarity 55 is in electrical contact with vessel 45. A number of small stainless steel wires 57 forming a network are passed through small diameter openings between the end surfaces of porous substrate 47. The stainless steel wires are welded to the vessel to provide support for the substrate and serve as a current collector for the positive electrode 55.

Prior to forming the Li-Al alloy, the substrate is allowed to soak for several hours in molten electrolyte to ensure wetting of its internal surfaces. Then, the open-ended cup is filled with the molten lithium electrode and the appropriate electrical connections made to form an electrochemical cell with lithium and the porous aluminum as electrodes. The alloy is formed at a controlled temperature of between 400° and 450°C. by alternately charging and discharging the cell. The cell discharges as lithium metal reacts to form lithium ions which, in turn, react with aluminum to form lithium-aluminum alloy. Charging of the cell involves the electrolysis of the lithium-aluminum alloy with return of lithium ions to the electrolyte and the electrodepositing of lithium into the mass of molten lithium metal. Each discharge cycle produces a stable cell potential of about 0.3 volt (Li-Al vs. Li) at open circuit. After several discharge and charge cycles a final discharge is performed to complete the Li-Al electrode. Suitable lithium-aluminum anodes have been prepared by electroprocesses involving from 2 to 18 cycles.

One form of cathode structure that has been found to be particularly suitable for use in the FIG. 1 modular cell includes a mixture of sulfur, arsenic metal and a nonporous, carbon black material. Sufficient carbon black is included to form a paste consistency at the operating temperature of the electrochemical cell. In order to maximize the amount of sulfur reactant that is present within the cathode, it is of importance that only a minimum amount of arsenic and carbon black be used. The arsenic is incorporated into the cathode in order to reduce the thermodynamic activity and the vapor pressure of the sulfur and therefore reduce sulfur loss. It has been found that a 10 a/o arsenic within the sulfur is sufficient to accomplish this purpose. To such a mixture of sulfur and arsenic is added approximately 15 w/o carbon black to achieve the pastelike texture of the cathode.

A cathode structure of this type is prepared by blending powders of sulfur and arsenic or arsenic-sulfur compounds in the desired proportion and heating the powdered mixture to 200°-250°C. The resulting viscous fluid is allowed to stand for several hours with occasional stirring at the elevated temperature to insure that a homogeneous solution is formed. A sufficient quantity of the nonporous, carbon black in the form of a fine powder is then blended into the molten solution to provide a uniform, semisolid paste. The paste is molded around a suitable current collector grid into the desired shape for use in an electrochemical cell. It has been found that this paste cathode will become a porous mass, admitting electrolyte, as it is operated within a cell.

In addition to the above described cathode structure, other suitable cathodes are presented in the published art as illustrated in the above cited references.

As shown in FIG. 1, cathode structure 21 is enclosed within an electrically insulative cloth 25 which serves as an interelectrode separator. Although several types of materials can be used in this interelectrode separator, it has been found that a knitted fabric of boron nitride thread is particularly well suited for this purpose. The boron nitride cloth is capable of electrically separating the electrodes even when disposed at small interelectrode distances and of resisting the extremely corrosive environment within the electrochemical cell operated at high temperatures. Other materials that may also be suitable for use as an interelectrode separator include zirconia, calcium zirconate, yttria or other ceramic material. In some instances, it may also be desirable to reinforce the separator and cathode structures with a netting of molybdenum or stainless steel mesh.

One example of an electrochemical cell of the type illustrated in FIG. 1 that has been built and tested included two lithium-aluminum alloy anodes separated by a cathode structure of sulfur, arsenic and carbon black. The cell was constructed as a 13 cm diameter disk having a height of about 4.5 cm. Each of the anode structures was about 12.8 cm diameter and 1.3 to 1.4 cm in thickness. The lithium-aluminum alloy within the anodes was formed by twice cycling between the porous aluminum electrode and a lithium pool electrode, as described above. A formation current of about 40 milliamps per $cm^2$, e.g. 5 amps over-all, was used in the electroprocessing to develop a capacity of about 60 amp hours in each of the anodes. The bottom electrode was spot-welded into the cell housing and the alloy formation was made within the bottom portion of the housing. The top anode was electroprocessed within a separate cell and assembled after the cathode was positioned within the cell housing.

The cathode employed comprised a paste of 55 w/o sulfur-32 w/o arsenic and 13 w/o carbon black molded into a disk of about 11 cm diameter and about 0.8 cm thickness. The paste was formed in two disk sections, one on either side of a central molybdenum mesh and pressed together. A small hole was drilled into the center of the paste surface to allow penetration of the upper electrical terminal into contact with the molybdenum mesh which served as a current collector. Additional molybdenum-mesh current collectors were layered over the top and bottom surfaces of the cathode disk and the upper terminal attached to all three of the molybdenum networks. The ends of the outer mesh were then sewed together at the edges to form a molybdenum basket around the cathode. The cathode assembly as thus completed with the upper electrical terminal in place was enclosed within a boron nitride cloth as an interelectrode separator. The cathode structure had a total weight of 150 grams and a theoretical capacity based on sulfur as a reactant of 140 amp hours. It and the other cell components including a sufficient quantity of electrolyte were assembled while maintaining the cell at about 400°C. After cooling the cell to room temperature, the cover was heliarc-welded to the housing to tightly seal the cell.

The cell was found to have an open circuit potential of 2.13 volts. It was operated for 331 hours in 11 cycles before the test was terminated when the cell could no longer be effectively recharged.

It can be seen that, although some problems still exist, the present invention provides a novel electrochemical cell design with several notable improvements. The sulfur or other chalcogen electrode is separated from the housing walls by a pair of anode structures as well as an interelectrode separator cloth. This arrangement is a significant step in the reduction of corrosion at the housing walls. Further corrosion reduction is obtained by selecting a lithium-aluminum alloy as an anode reactant, as this alloy is of lower thermodynamic activity than the elemental lithium anode. The cell also employs an improved system of electrical terminals which permit the current collectors within the cathode to run from the periphery to the cell center, thereby reducing current path length and the over-all proportion of cell weight contributed by current collector materials.

The embodiments of the invention in which an exclusive property or privilege is claimed are defined as follows:

1. A modular, secondary electrochemical cell including an anode containing an alkali metal reactant, a cathode containing a chalcogen and a molten electrolyte including ions of said alkali metal, the improvement comprising:
   a hollow housing having a small height relative to breadth;
   first and second anode structures adjacent to the inner end surfaces of said housing and in electrical contact with said housing, said anode structures including a porous, solid substrate with said alkali metal reactant within the interstices of said substrate;
   a cathode structure disposed between said anode structures, said cathode structure comprising a porous, mass during operation of said cell;
   a porous layer of electrically insulative material immersed in said electrolyte intermediate said cathode and anode structures for preventing direct anode to cathode contact; and
   first and second electrical terminals in coaxial alignment with said housing at the upper and lower end surfaces thereof.

2. The electrochemical cell of claim 1 wherein said housing, cathode structure and anode structures are of disk shape with the outer circumferential surfaces of said anode structure in contact with the inner circumferential surfaces of said housing and said cathode structure having circumferential surfaces spaced radially from said inner housing surfaces.

3. The electrochemical cell of claim 2 wherein an electrically conductive grid is embedded within said cathode structure, said grid having sinuous conductors disposed along radii of said cathode in electrical communication with said second electrical terminal at the center portion of said cathode structure.

4. The electrochemical cell of claim 1 wherein said first electrical terminal is in electrical communication with said housing and said anode structures, said second electrical terminal being provided with sheath means for insulating said housing and anode structures therefrom while being in electrical communication with said cathode structure.

5. The electrochemical cell of claim 1 wherein said first and second electrical terminals are of corresponding, mating construction to permit the stacking of a plurality of cells in electrical series.

6. The electrochemical cell of claim 1 wherein said first and second anode structures comprise an aluminum substrate of 40 to 60% porosity having lithium-aluminum alloy formed by electrodeposition of lithium in interstices thereof.

7. A method of preparing the electrochemical cell of claim 1 wherein said first and second anode structures are formed by electrodepositing lithium metal into the interstices of an interlocked structure of aluminum fibers to form a lithium-aluminum alloy therein.

8. A method of preparing an electrode structure containing a lithium-aluminum alloy for an electrolytic cell comprising:
   a. submersing a substrate of 40 to 60% porosity within a molten electrolyte including lithium ions, said substrate comprising a matrix of interlocked aluminum fibers;
   b. electrodepositing lithium metal into interstices of said substrate to form lithium-aluminum alloy therein.

* * * * *